United States Patent [19]

Umeki et al.

[11] 3,977,985

[45] Aug. 31, 1976

[54] MAGNETIC RECORDING MEDIUM COMPRISING COBALT OR COBALT ALLOY COATED PARTICLES OF SPICULAR MAGNETITE

[75] Inventors: Shinji Umeki, Saku; Fujio Shibata, Yachiyo; Kazuo Takada, Ohmiya, all of Japan

[73] Assignee: TDK Electronics Company, Limited, Tokyo, Japan

[22] Filed: Dec. 13, 1974

[21] Appl. No.: 532,681

Related U.S. Application Data

[62] Division of Ser. No. 501,827, Aug. 29, 1974, which is a division of Ser. No. 334,598, Feb. 22, 1973, abandoned.

[30] Foreign Application Priority Data

Feb. 23, 1972  Japan............................ 47-18627

[52] U.S. Cl............................. 252/62.55; 75/0.5 AA; 148/31.55; 148/105; 427/128
[51] Int. Cl.²...................... B22F 3/00; H01F 1/04; C22C 1/04
[58] Field of Search............. 148/31.55, 31.57, 103, 148/105, 108; 427/127, 128; 252/62.55, 62.56; 75/.5 AA

[56] References Cited
UNITED STATES PATENTS

| | | | |
|---|---|---|---|
| 3,026,215 | 3/1962 | Fukuda et al. | 148/108 |
| 3,607,218 | 9/1971 | Akashi et al. | 75/.5 AA |
| 3,702,270 | 11/1972 | Kawasaki et al. | 148/105 |
| 3,720,618 | 3/1973 | Toda et al. | 252/62.56 |
| 3,748,119 | 7/1973 | Hwang et al. | 75/.5 AA |

*Primary Examiner*—Walter R. Satterfield
*Attorney, Agent, or Firm*—Staas & Halsey

[57] ABSTRACT

A magnetic recording medium is disclosed as comprising powdered magnetic particles upon which there is deposited a ferro-magnetic metal or alloy such as cobalt or a cobalt alloy. Each magnetic particle is a spiculate magnetite and the deposit of cobalt or a cobalt alloy is in the range of 0.5 wt.% to 30 wt.%. The particles are heat treated in either a reducing or inert atmosphere to a sufficient temperature to improve the magnetic characteristics of the particles including their coercive force, $Br/\rho$ and $Bm/\rho$. A layer of the recording medium is disposed on a support layer of polyester to form a magnetic tape.

6 Claims, 5 Drawing Figures

MAGNETIC RECORDING MEDIUM COMPRISING COBALT OR COBALT ALLOY COATED PARTICLES OF SPICULAR MAGNETITE

CROSS-REFERENCE TO RELATED APPLICATIONS

The present application is a division of U.S. patent application Ser. No. 501,827, filed Aug. 29, 1974 which is a division of U.S. patent application Ser. No. 334,598, filed Feb. 22, 1973, now abandoned.

BACKGROUND OF THE INVENTION

1. Field of the Invention

This invention relates to Magnetic powders with high coercive force and the method of producing.

2. Description of the Prior Art

Recently, magnetic recording techniques have been applied to such various fields where conventional magnetic materials cannot respond to demands for recording data. Specifically, magnetic materials having a high coercive force are required for those applications where high density data is recorded. Conventional spiculate iron oxides, $0.5\mu$ to $1.0\mu$ long, have typically coercive forces in the range of 250 Oe to 400 Oe. It is known that cobalt-doped iron oxide and spiculate chromium dioxide have still higher coercive force. Cobalt-doped iron oxide is, however, heavily demagnetized when it is heated or pressed, and hence deterioration due to repetitive processes is a serious problem in practice. Spiculate chromium dioxide is so hard in the particle form that the head of the recorder is apt to be worn out. Curie point of chromium dioxide is rather low, i.e. 126°c, and so reliability is poor with respect to the preservation of recorded signals.

SUMMARY OF THE INVENTION

The object of this invention is to provide a high coercive force magnetic material which is magnetically stable and does not wear excessively the recorder head.

In accordance with this and other objects of the invention, there is provided a method of producing a magnetic recording material of high density and high coercive force wherein a ferro-magnetic metal or alloy (cobalt or cobalt alloy) is deposited on the surface of a core comprising a spiculate magnetite and the alloy-deposited core is heat-treated.

In an illustrative embodiment of this invention, high coercive force magnetic material includes a spiculate magnetite about $0.5\mu$ long, on the surface of which a ferromagnetic cobalt or cobalt alloy is deposited, the amount of deposition being 0.5% to 30%. It has been found that the coercive force of magnetic powder of such structure is improved in proportion to the amount of deposited cobalt if it is properly heat-treated. For instance, in the case that the core is spiculate magnetite having a coercive force of 450 Oe and the amount of deposited cobalt is 10%, the coercive force of the product is 600 Oe; if the amount of deposited cobalt is 4.0%, the coercive force is 900 Oe.

The coercive force of such magnetic powder is not decreased at high temperature, in contrast to the effect on cobalt-doped iron oxide or spiculate chromium dioxide. Demagnetization upon heating, which is known in cobalt-doped iron oxide, does not appear in the magnetic material of this invention. The effect of heat-treatment according to this invention is significant because it increases the coercive force and decreases changes due to time lapse.

BRIEF DESCRIPTION OF THE DRAWINGS

These and other objects and advantages of the present invention will become more apparent by referring to the following detailed description and accompanying drawings, in which.

EMBODIMENTS OF THIS INVENTION

EXAMPLE 1

In this example, hydro-boron-sodium was used as a reducing agent.

50 grams of spiculate magnetite were dispersed into 500ml of ion-exchange water, the mean length of the magnetite particles being $0.5\mu$ and the ratio of the length to diameter being 8/1.

This step of the process will be called pre-treatment hereinafter in the other examples.

Next, reactive solution was prepared by blending solutions A and B, the composition of the solutions being as follows:

| Solution A | |
|---|---|
| cobalt chloride | 0.05 mol (about 12 grams) |
| chelating agent | 0.10 mol |
| water | 400 ml |

The pH value of the solution A was adjusted to 12.0 to 13.0 by 2N-NaOH solution.

| Solution B | |
|---|---|
| hydro-boron-sodium | 1 – 4 grams |
| 2N-NaOH solution | 50 ml |

Solutions A and B were independently prepared and then both were mixed together. Spiculate magnetite was dispersed into the mixed solution and the mixture was heated until gas was generated. Although the gas-generating temperature depends on the kind of the chelating agent, the generation of gas starts at rather low temperature, e.g. at 30°c, in the case of Rochell salt. After gas generation was finished, the product obtained was heated at 70°c for 30 minutes. The product obtained after reaction was washed with water, filtered and heat-treated at 400°c in nitrogen atmosphere for 60 minutes. Nitrogen atmosphere may be changed to hydrogen atmosphere.

The characteristics of the product are shown in the table 1 in various cases wherein Rochell salt, sodium tartrate and sodium citrate were used as the chelating agent, the amount of hydro-boron-sodium was 1g, 2g and 4g, and the pH value was 12.0, 12.5 and 13.0.

Figure 1:
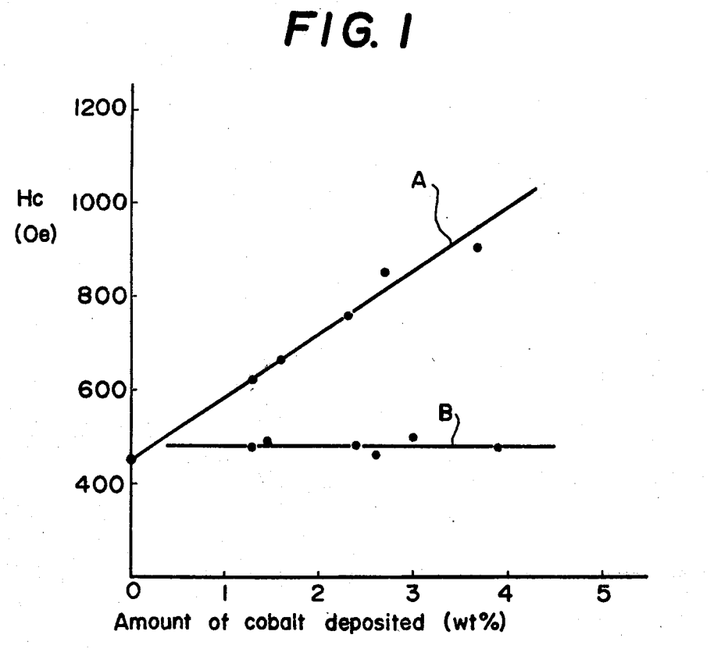
FIG. 1 is the characteristics curve showing the relation between the amount of deposited cobalt and the coercive force.

The table 2-1 shows the relation between the amount of deposited cobalt before and after heat-treatment and the coercive force Hc of the product, while the graphical expression of the table 2-1 is FIG. 1, where A denotes the characteristics after the heat-treatment and B denotes before the heat-treatment.

Reactive solution was prepared and was mixed with the above-mentioned solution containing magnetite and was heated to boiling, the composition of the reactive solution being as follows:

Composition of the reactive solution

| cobalt chloride | 0.5 mol |
| sodium tartrate | 1.0 mol |
| sodium hypophosphite | 2.0 mol |
| water | 10.0 l |

Table 1

| Sample No. | condition of reaction chelating agent | hydro-boron-sodium (g) | pH | properties before heat-treatment amount of deposited cobalt (wt.%) | Hc (Oe) | Br/ρ (G.cm³/g) | Bm/ρ (G.cm³/g) | properties after heat-treatment Hc (Oe) | Br/ρ (g.cm³/g) | Bm/ρ (g.cm³/g) | Br/Bm |
|---|---|---|---|---|---|---|---|---|---|---|---|
| 11 | sodium citrate | 1 | 12.0 | 1.5 | 490 | 504 | 1033 | 620 | 523 | 1017 | 0.514 |
| 12 | " | 2 | 12.5 | 1.7 | 492 | 511 | 1035 | 704 | 512 | 1018 | 0.503 |
| 13 | " | 4 | 13.0 | 3.0 | 492 | 510 | 1020 | 803 | 507 | 1015 | 0.499 |
| 14 | sodium tartrate | 1 | 12.5 | 2.4 | 480 | 489 | 980 | 804 | 501 | 957 | 0.523 |
| 15 | " | 2 | 13.0 | 3.7 | 482 | 464 | 959 | 896 | 501 | 952 | 0.526 |
| 16 | " | 4 | 12.0 | 2.7 | 478 | 504 | 1016 | 848 | 508 | 993 | 0.511 |
| 17 | Rochell salt | 1 | 13.0 | 3.9 | 474 | 466 | 962 | 904 | 490 | 933 | 0.525 |
| 18 | " | 2 | 12.0 | 2.3 | 464 | 482 | 990 | 756 | 517 | 997 | 0.520 |
| 19 | " | 4 | 12.5 | 2.6 | 460 | 488 | 1002 | 821 | 509 | 1010 | 0.504 |

Table 2-1

| Cobalt contained (wt.%) | after heat-treatment Hc(Oe) | before heat-treatment Hc(Oe) |
|---|---|---|
| 0 | 450 | 450 |
| 1.3 | 620 | 474 |
| 1.6 | 660 | 492 |
| 2.3 | 760 | 464 |
| 2.7 | 850 | 478 |
| 3.7 | 900 | 482 |

Figure 2:
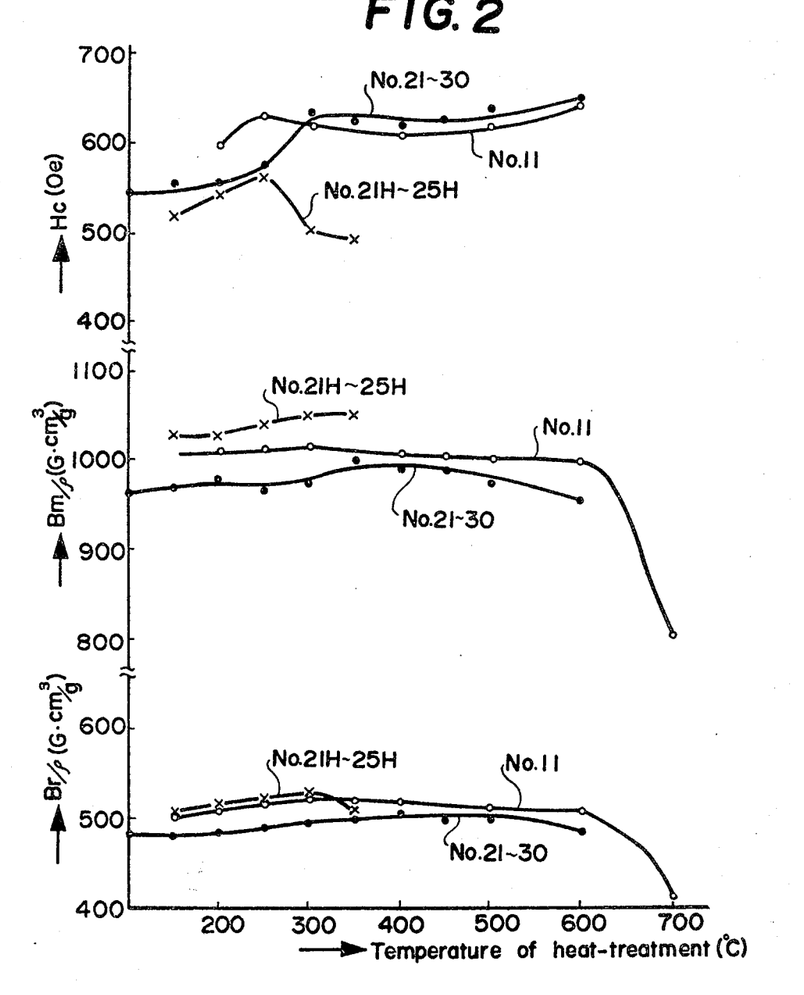
FIG. 2 is the characteristic curve showing the relation between the temperature of heat-treatment and the coercive force, $Bm/\rho$ or $Br/\rho$.

FIG. 2 shows the change of Hc, Bm/ρ and Br/ρ of the sample No. 11 and the other samples, which will be described hereinafter in examples, as the temperature of the heat-treatment is changed.

As clear from above description, the magnetic powder of high coercive force, eg 500 Oe to 1000 Oe, can be obtained according to this invention.

EXAMPLE 2

In this example, sodium hypophosphite was used as the reducing agent.

2500 grs. of spiculate magnetite were dispersed into 20l of ion-exchange water, the mean length of the magnetite particle being 0.5μ and the ratio of the length to diameter being 8/1.

The pH value of the above solution was adjusted to 12.0 (at 20°c) by 2N-NaOH solution.

As the result of the above process, powder was obtained, and then the powder was heat-treated at 100°c to 600°c in a nitrogen atmosphere. The properties of the material obtained are shown in the table 2-2 and FIG. 2.

Table 2-2

| sample No. | temperature of heat-treatment | magnetic properties Hc | Br/ρ | Bm/ρ | Br/Bm |
|---|---|---|---|---|---|
| 21 | 100°c | 548(Oe) | 487(G.cm³/g) | 965(G.cm³/g) | 0.505 |
| 22 | 150 | 552 | 486 | 970 | 0.501 |
| 23 | 200 | 552 | 487 | 980 | 0.497 |
| 24 | 250 | 572 | 489 | 968 | 0.505 |
| 25 | 300 | 628 | 498 | 975 | 0.511 |
| 26 | 350 | 624 | 501 | 1002 | 0.500 |
| 27 | 400 | 608 | 508 | 990 | 0.513 |
| 28 | 450 | 624 | 505 | 1004 | 0.503 |
| 29 | 500 | 632 | 500 | 972 | 0.514 |
| 30 | 600 | 648 | 490 | 960 | 0.510 |

Each sample containes 1.3wt% of deposited cobalt. As clear from the table 2-2, 500 Oe to 700 Oe of coercive force can be obtained by the heat-treatment, and moreover, Br/ρ and Bm/ρ are 500 G.cm³/g and 1000G.cm³/g, respectively.

In the case that the heat-treatment was carried out at 150°c to 350°c for 60 minutes in the hydrogen flow (flow rate was 2l/min.), the product has properties shown in the table 3.

Table 3

| sample No. | temperature of heat-treatment °C | Hc (Oe) | Br/ρ (G.cm³/g) | Bm/ρ (G.cm³/g) | Br/Bm |
|---|---|---|---|---|---|
| 21H | 150 | 518 | 511 | 1027 | 0.491 |
| 22H | 200 | 544 | 517 | 1028 | 0.503 |
| 23H | 250 | 562 | 523 | 1042 | 0.502 |
| 24H | 300 | 502 | 530 | 1051 | 0.504 |

Table 3-continued

| sample No. | temperature of heat-treatment °C | Hc (Oe) | Br/ρ (G.cm³/g) | Bm/ρ (G.cm³/g) | Br/Bm |
|---|---|---|---|---|---|
| 25H | 350 | 492 | 515 | 1052 | 0.490 |

EXAMPLE 3

In this example, hydrazine hydrate was used as the reducing agent.

50 grs. of spiculate magnetite were dispersed into 250ml of ion-exchange water, the mean length of the magnetite particle being 0.5μ and the ratio of the length to diameter being 8/1. Reactive solution was prepared and was mixed with the abovementioned solution containing magnetite and was kept at 80°c for an hour, the composition of the reactive solution being as follows:

Composition of the reactive solution

Table 4

| | condition of reaction | | | properties before heat-treatment | | | | properties after heat-treatment | | | | |
|---|---|---|---|---|---|---|---|---|---|---|---|---|
| sample No. | cobalt chloride (g) | hydrazine hydrate (g) | sodium tartrate (g) | amount of deposited cobalt (wt.%) | Hc (Oe) | Br/ρ (G.cm³/g) | Bm/ρ (G.cm³/g) | temperature of heat-treatment (°C) | Hc (Oe) | Br/ρ (G.cm³/g) | Bm/ρ (G.cm³/g) | Br/Bm |
| 31A | 2 | 4 | 10 | 1.22 | 4600e | 513 | 1031 | 300 | 528 | 518 | 1022 | 0.507 |
| 31B | 2 | 4 | 10 | 1.22 | 460 | 513 | 1031 | 500 | 564 | 502 | 982 | 0.511 |
| 31C | 2 | 4 | 10 | 1.22 | 460 | 513 | 1031 | 700 | 644 | 409 | 815 | 0.502 |
| 32 | 2 | 10 | 20 | 1.19 | 512 | 498 | 1002 | 300 | 612 | 500 | 970 | 0.515 |
| 33 | 2 | 16 | 30 | 1.20 | 452 | 525 | 1061 | 300 | 576 | 513 | 1012 | 0.507 |
| 34A | 4 | 4 | 30 | 2.23 | 488 | 479 | 1005 | 300 | 532 | 500 | 991 | 0.504 |
| 34B | 4 | 4 | 30 | 2.23 | 488 | 479 | 1005 | 500 | 500 | 507 | 1019 | 0.498 |
| 34C | 4 | 4 | 30 | 2.23 | 488 | 479 | 1005 | 700 | 512 | 415 | 855 | 0.485 |
| 35 | 4 | 10 | 10 | 2.36 | 492 | 493 | 1018 | 300 | 704 | 524 | 1022 | 0.513 |
| 36 | 4 | 16 | 20 | 2.23 | 484 | 490 | 1004 | 300 | 692 | 516 | 992 | 0.518 |
| 37A | 6 | 4 | 20 | 3.06 | 488 | 486 | 987 | 300 | 724 | 506 | 974 | 0.520 |
| 37B | 6 | 4 | 20 | 3.06 | 488 | 486 | 987 | 500 | 744 | 504 | 968 | 0.521 |
| 37C | 6 | 4 | 20 | 3.06 | 488 | 486 | 987 | 700 | 832 | 393 | 758 | 0.518 |
| 38 | 6 | 10 | 30 | 3.26 | 480 | 501 | 1026 | 300 | 732 | 512 | 991 | 0.517 |
| 39 | 6 | 16 | 10 | 3.20 | 492 | 497 | 1020 | 300 | 768 | 513 | 990 | 0.518 |

| | |
|---|---|
| Cobalt chloride $CoCl_2.6H_2O$ | 2 – 6g |
| Sodium tartrate $C_4H_4C_6Na_2.2H_2O$ | 10 – 30g |
| Hydrazine Hydrate $N_2H_4.H_2O$ | 4 – 16g |
| water | 250ml |

The pH value of the solution was adjusted to 13.0 by 2N-NaOH solution.

Results obtained by experiments are shown in the table 4 in cases where the amounts of cobalt chloride are 2 grs, 4 grs. and 6 grs. and; the amounts of sodium tartrate are 10 grs, 20 grs and 30 grs; and the amount of Hydrazine Hydrate are 4 grs., 10 grs. and 16 grs, respectively.

Heat-treatment was carried out in nitrogen flow of a rate of 10l/min.

In every case, 500 Oe to 800 Oe of coercive force can be obtained by the heat-treatment, and Br/ρ and Bm/ρ are 500 G·cm³/g and 1000 G.cm³/g, respectively.

EXAMPLE 4

Cobalt-zinc, cobalt-copper and cobalt-manganese alloys were used as cobalt alloy to be deposited in this case.

The pre-treatment was applied as well as the example 1, and the reactive solution and the condition of reaction was as follows:

1. In case of cobalt-zinc alloy

| | |
|---|---|
| cobalt chloride | 10g |
| Rochell salt | 22g |
| hydrazine hydrate | 50g |
| zinc chloride | 1 – 4g |
| water | 500 ml |

These constituents were blended and kept at 70°c for 120 minutes, pH value being 12.0.

2. In case of cobalt-copper alloy

| | |
|---|---|
| cobalt chloride | 12g |
| Sodium tartrate | 100g |
| Boric acid | 40g |
| Sodium hypophosphite | 50g |
| Copper (II) Chloride | 1 – 4g |
| Water | 500 ml |

These constituents were blended and kept at 100°c for 60 minutes, pH value being 9.0.

3. In case of cobalt manganese alloy

| | |
|---|---|
| Cobalt chloride | 12g |
| Sodium tartrate | 100g |
| Boric acid | 40g |
| Sodium hypophosphite | 50g |
| Manganese chloride | 1 – 4g |
| Water | 500 ml |

These constituents were blended and kept at 100°c for 60 minutes, pH value being 9.0.

The powder gained was pre-treated (concerning the definition of pre-treatment, see the example 1) and was reacted with the reactive solution, and then the product obtained was washed with water, filtered and dried. Finally, it was heat-treated at 300°c for 60 minutes in nitrogen atmosphere. The properties of the product are shown in the table 5.

Table 5

| Sample No. | metalic salt added kind | amount (g) | amount of deposited alloy Co (wt.%) | Zn (wt.%) | Cu (wt.%) | Mn (wt.%) | coercive force (Oe) before heat-treatment | after heat-treatment |
|---|---|---|---|---|---|---|---|---|
| 41 | Zinc | 1.0 | 3.8 | 1.9 | | | 482 | 592 |
| 42 | chlo- | 2.0 | 4.0 | 3.1 | | | 490 | 560 |
| 43 | ride | 4.0 | 4.3 | 3.3 | | | 482 | 544 |
| 44 | Copper | 1.0 | 3.0 | | 0.4 | | 476 | 520 |
| 45 | (II) | 2.0 | 0.9 | | 0.8 | | 472 | 552 |
| 46 | chloride | 4.0 | 1.6 | | 1.8 | | 464 | 536 |
| 47 | manga- | 1.0 | 4.9 | | | 0.4 | 416 | 504 |
| 48 | nese | 2.0 | 1.5 | | | 0.3 | 474 | 608 |
| 49 | chloride | 4.0 | 1.1 | | | 0.4 | 472 | 580 |

As clear from the table 5, in every case 500 Oe to 600 Oe of coercive force can be obtained by the heat-treatment, and $Br/\rho$ and $Bm/\rho$ are 500 G.cm³/g and 1000 G.cm³/g, respectively (not shown in the table 5).

EXAMPLE 5

Sodium dithionite $Na_2S_2O_4$ was used as the reducing agent in this case.

50grs. of spiculate magnetite was dispersed into 500ml of ion exchange water, the mean length of the magnetite particle being $0.5\mu$ and the ratio of the length to diameter being 8/1.

Reactive solutions A and B were prepared and mixed with the above solution containing spiculate magnetite dispersed. This mixture was stirred for 60 minutes to be reacted, the temperature and the volumes of solutions A and B being shown in the table 6.

Table 6

| sample No. | solution A ml | solution B ml** | temperature °c |
|---|---|---|---|
| 51 | 20 | 10 | 70 |
| 52 | 20 | 10 | 100 |
| 53 | 60 | 30 | 70 |
| 54 | 60 | 30 | 100 |
| 55 | 100 | 50 | 70 |
| 56 | 100 | 50 | 100 |
| 57 | 200 | 100 | 100 |

*Solution A
$CoCl_2.6H_2O$  60g
Rochell salt  140g

Table 6-continued

| sample No. | solution A ml | solution B ml** | temperature °c |
|---|---|---|---|
| | NaOH 40g | | |

These constituents were solved into water and the total volume was 1200 ml.
**Solution B
$Na_2S_2O_4$  60g It was solved into 2N-NaOH water solution, and the total volume was 600ml.

After the above-mentioned reaction was finished, the powder gained was washed with water, filtered and dried, and then heat-treated at 300°c for 60 minutes in a nitrogen atmosphere. The properties of the product are shown in the table 7.

Table 7

| Sample No. | amount of Co contained (wt.%) | before heat-treatment Hc (Oe) | Br/ρ (G.cm³/g) | Bm/ρ (G.cm³/g) | Br/Bm | after heat-treatment Hc (Oe) | Br/ρ (G.cm³/g) | Bm/ρ (G.cm³/g) | Br/Bm |
|---|---|---|---|---|---|---|---|---|---|
| 51 | 1.0 | 440 | 1032 | 498 | 0.483 | 532 | 1024 | 507 | 0.495 |
| 52 | 1.0 | 444 | 1026 | 501 | 0.488 | 528 | 1040 | 517 | 0.497 |
| 53 | 2.6 | 464 | 990 | 489 | 0.494 | 752 | 998 | 521 | 0.522 |
| 54 | 2.7 | 456 | 1013 | 492 | 0.486 | 680 | 1005 | 512 | 0.509 |
| 55 | 4.1 | 452 | 973 | 474 | 0.487 | 828 | 998 | 508 | 0.509 |
| 56 | 4.4 | 448 | 945 | 460 | 0.487 | 740 | 994 | 508 | 0.511 |
| 57 | 7.0 | 452 | 918 | 440 | 0.479 | 788 | 918 | 483 | 0.526 |

As clear from the table 7, in every case 500 Oe to 900 Oe of coercive force can be obtained by the heat-treatment, and $Br/\rho$ and $Bm/\rho$ are 500 G.cm³/g and 1000 G.cm³/g, respectively.

It will be well-understood by the above examples that magnetic properties are greatly improved according to this invention. More detailed magnetic characteristics will be described about samples picked from aforementioned examples, and compared with those of conventional materials, for reference.

The table 8 shows the change of the magnetic characteristics of the sample No. 11 of the example 1 when the temperature of heat-treatment is changed from 200°c to 700°c step by step.

Table 8

| temperature | Hc (Oe) | Br/ρ(G.cm³/g) | Bm/ρ(G.cm³/g) | Br/Bm |
|---|---|---|---|---|
| 200°c | 600 | 517 | 1010 | 0.511 |
| 250 | 616 | 523 | 1010 | 0.518 |
| 300 | 620 | 523 | 1015 | 0.515 |
| 400 | 608 | 520 | 1005 | 0.517 |
| 500 | 622 | 511 | 1000 | 0.511 |
| 600 | 641 | 508 | 995 | 0.510 |

Table 8-continued

| temperature | Hc (Oe) | Br/ρ(G.cm³/g) | Bm/ρ(G.cm³/g) | Br/Bm |
|---|---|---|---|---|
| 700 | 705 | 415 | 800 | 0.519 |

FIG. 2 is the graphical expression of the table 8, and the characteristics of the other samples are shown together.

Next, coercive force Hc and residual magnetic flux Br will be discussed in detail. Tables 9 and 10 show the relation between these characteristics and the environmental temperature concerning samples Nos. 11 and 35. Concerning conventional materials such as $\gamma$-$Fe_2O_3$ containing cobalt, $Fe_3O_4$ containing cobalt, and $CrO_2$, the properties are shown for reference.

Table 9 (Hc)

| Sample \ temperature (°C) | 25 | 40 | 60 | 80 | 100 | 120 |
|---|---|---|---|---|---|---|
| $\gamma$-$Fe_2O_3$ containing Co | 678 | 620 | 554 | 499 | 451 | 420 |
| $Fe_3O_4$ containing Co | 572 | 543 | 508 | 443 | 375 | 341 |
| $CrO_2$ | 485 | 459 | 400 | 310 | 190 | — |
| No.11 | 620 | 603 | 580 | 559 | 535 | 519 |
| No.35 | 704 | 691 | 676 | 670 | 648 | 612 |

Table 10 (Br)

| sample \ temperature (°C) | 25 | 40 | 60 | 80 | 100 | 120 |
|---|---|---|---|---|---|---|
| $\gamma$-$Fe_2O_3$ containing Co | 519 | 503 | 441 | 398 | 379 | 370 |
| $Fe_3O_4$ containing Co | 513 | 511 | 508 | 497 | 477 | 452 |
| $CrO_2$ | 472 | 472 | 467 | 450 | 368 | 196 |
| No.11 | 523 | 522 | 520 | 518 | 514 | 514 |
| No.35 | 524 | 524 | 523 | 522 | 518 | 515 |

Figure 3:
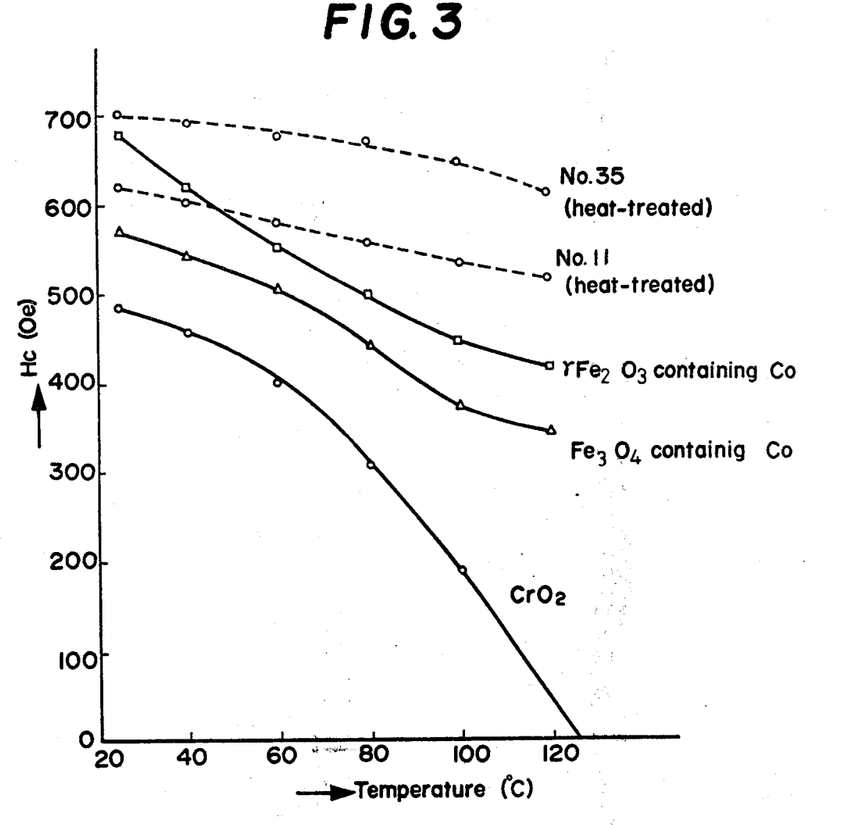
FIG. 3 is the characteristic curve showing the relation between the coercive force of the magnetic material of this invention and the temperature of it.
Figure 4:
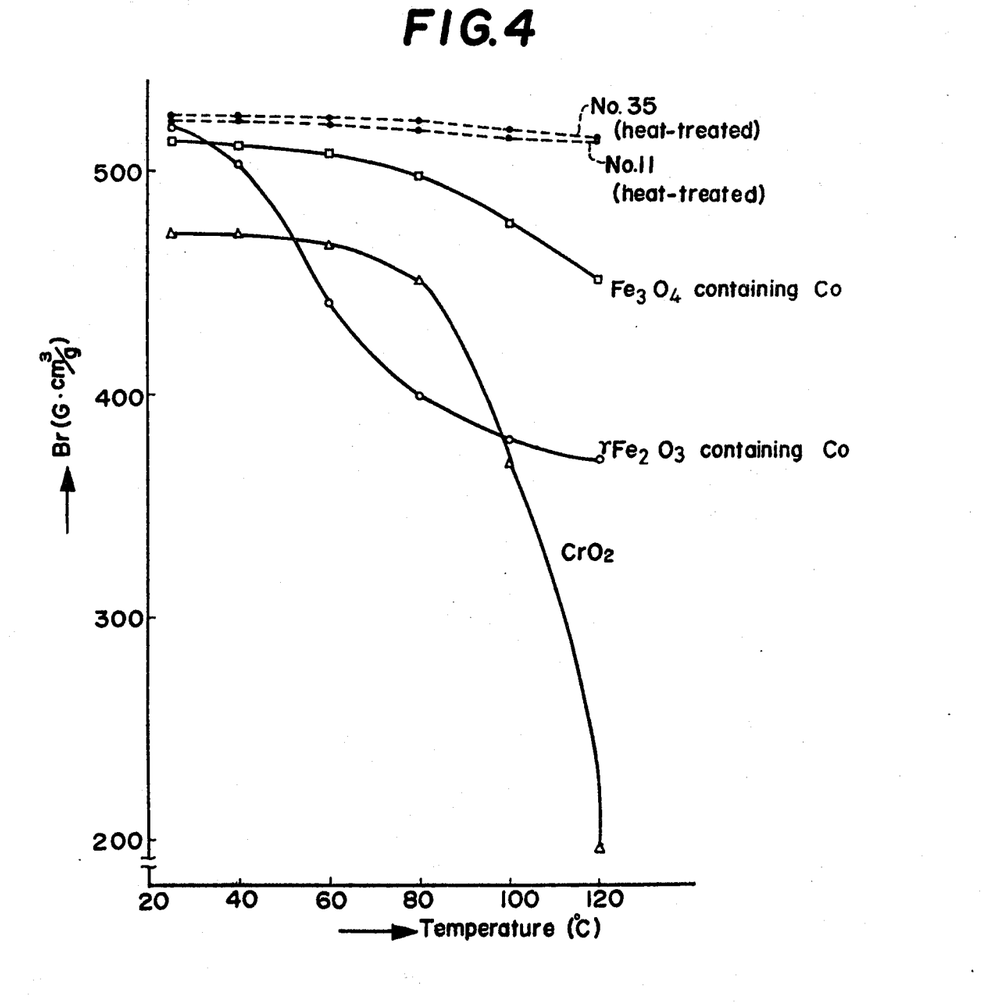
FIG. 4 is the characteristic curve showing the relation between the residual magnetic flux density of the magnetic material of this invention and the temperature of it; (The characteristics of the material of the prior art being shown for reference in FIGS. 3 and 4.)

FIGS. 3 and 4 are the graphical expression of the tables 9 and 10. As clear from these tables and drawings, the magnetic characteristics of the samples of this invention hardly depends on temperature. Although only a few samples are shown in the above tables, the same feature was confirmed in the other samples.

According to this invention, cobalt or cobalt alloy is deposited on the surface of the core comprising of $Fe_3O_4$, and the thus-obtained cobalt-including $Fe_3O_4$ is heat-treated so that the magnetic properties of the material are greatly improved.

Spiculate magnetite about $0.5\mu$ long which has been widely used in the prior art is used as core, and metallic cobalt or cobalt alloy is deposited by 0.5% to 30% on the surface of the core and this cobalt-including magnetite is heat-treated in inert gas atmosphere such as nitrogen or Argon or in reductive atmosphere such as hydrogen or propane so that the coercive force can be increased. For instance, cobalt is deposited 1% on the spiculate magnetite, coercive force of which is 450 Oe, the coercive force of the product is 474 Oe before heat-treatment, while it increases to 600 Oe after the heat-treatment of this invention. In the case that the amount of deposited cobalt is 4.0%, the coercive force changes from 490 Oe to 900 Oe as a result of the heat-treatment.

Figure 5:
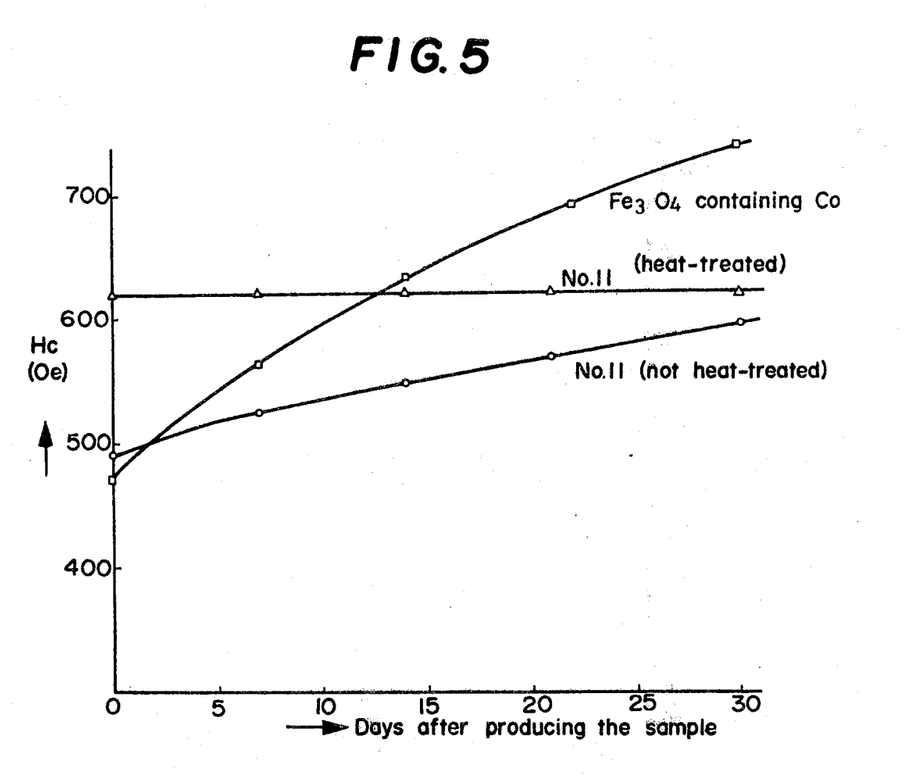
FIG. 5 shows the change of properties due to time lapse of the material of this invention. (Properties of the conventional material and the material of this invention which is not heat-treated being shown for reference in FIG. 5.)

Moreover, the change of properties due to time lapse is decreased by heat-treatment. FIG. 5 shows the relation between the change of properties and time lapse at room temperature. Changes of properties of the sample No. 11 are shown by two curves (one denotes "heat-treated", and the other "not heat-treated"), and Hc curve of cobalt-containing $Fe_3O_4$ is shown for reference.

The characteristics of the material heat-treated in an inert gas such as nitrogen according to this invention are shown in FIG. 2. As clear from FIG. 2, if the heat-treatment is carried out at a temperature lower than 100°c, the coercive force is scarcely increased and changes due to time lapse are rather large.

On the contrary, if the temperature of heat-treatment exceeds 600°c, Bm/ρ and Br/ρ are sharply decreased.

Therefore, it will be desireable that the heat-treatment is carried at a temperature between 100°c and 600°c if an inert gas is used.

In the case that the heat-treatment is carried out in a reductive gas such as hydrogen, coercive force is hardly improved if the temperature of heat-treatment is less than 100°c as well as in the case of the inert gas, and coercive force is decreased if the temperature exceeds 300°c as shown in FIG. 2.

The magnetic powder of this invention is produced by the above-mentioned method, and a magnetic paint is made from the obtained magnetic powder and it is painted on a polyester film. Thus, a magnetic tape is obtained. The composition of an example of a magnetic paint is produced as follows:

| Composition of one of magnetic paints. | | |
|---|---|---|
| sample No.11 (heat-treated) | 120 | parts |
| copolymer of vinyl chloride and vinyl acetate | 30 | ″ |
| nitride butadiene rubber | 10 | ″ |
| carbon black | 10 | ″ |
| surface active agent | 1.5 | ″ |
| MEK (methyl ethyl ketone) | 150 | ″ |
| MIBK (methyl isobutyl ketone) | 150 | ″ |
| lubricant | 3 | ″ |

The above constituents are mixed by kneading in a ballmill for 48 hours, and the paint obtained is spreaded on the polyester film so that a magnetic tape is produced. The magnetic properties of it are as follows:

| | |
|---|---|
| Hc | 552 Oe |
| Br | 1675 Gauss |
| Bm | 2090 " |
| rectangular ratio | 0.801 |
| film thickness | 0.8μ |

Thus, the magnetic tape made from the magnetic powder of this invention has excellent properties. Though only one sample of this invention is used in the above-mentioned magnetic tape, it has been confirmed by experiments that a magnetic tape made from any other of the samples of this invention with improved properties..

This description is made with regard to a magnetic tape, but the magnetic material of this invention can be used with other magnetic recording media.

Numerous changes may be made in the above described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. A magnetic recording medium comprising a layer of magnetic material disposed on a support layer wherein said layer of magnetic material comprises corpuscular magnetic core particles of spicular magnetite, with a coating of a material selected from the group consisting of cobalt and an alloy of cobalt wherein the amount of cobalt in said coating is in the range of from 4 to 10 wt% and is formed by heating a deposit selected from said group, said layered particles being heat treated to a temperature greater than 100°C, to effect said layered particles having a coercive force in the range of 490 to 900 Oe.

2. A magnetic recording medium as in claim 1, wherein said support layer comprises an extended strip of a polyester.

3. A magnetic recording medium as in claim 1, wherein said layer of magnetic material is mixed with other constituents to form a magnetic paint which is applied as a layer on said support layer.

4. A magnetic recording medium as in claim 1, wherein said layered particles are heat treated in an inert gas at a temperature between 100°C and 600°C.

5. A magnetic recording medium as in claim 1, wherein said layered particles are heat treated in a reductive gas at a temperature between 100°C and 300°C.

6. A magnetic recording medium as in claim 1, wherein said magnetic core particles have a mean length of approximately 0.5 microns.

* * * * *

UNITED STATES PATENT AND TRADEMARK OFFICE
CERTIFICATE OF CORRECTION

PATENT NO. : 3,977,985
DATED : August 31, 1976
INVENTOR(S) : Shinji Umeki, Fujio Shibata and Kazuo Takada It is certified that error appears in the above—identified patent and that said Letters Patent are hereby corrected as shown below:

Column 7, Table 6, after "Solution A ml" insert an asterisk --*--.

Column 8, Table 6, after "Solution A ml" insert an asterisk --*--.

Signed and Sealed this

Twenty-third Day of November 1976

[SEAL]

Attest:

RUTH C. MASON
Attesting Officer

C. MARSHALL DANN
Commissioner of Patents and Trademarks